(12) United States Patent
Polymenakos et al.

(10) Patent No.: US 11,645,473 B2
(45) Date of Patent: *May 9, 2023

(54) END-OF-TURN DETECTION IN SPOKEN DIALOGUES

(71) Applicants: International Business Machines Corporation, Armonk, NY (US); The Regents of the University of Michigan, Ann Arbor, MI (US)

(72) Inventors: Lazaros Polymenakos, West Harrison, NY (US); Dimitrios B. Dimitriadis, White Plains, NY (US); Zakaria Aldeneh, Ann Arbor, MI (US); Emily Mower Provost, Ann Arbor, MI (US)

(73) Assignees: INTERNATIONAL BUSINESS MACHINES CORPORATION, Armonk, NY (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 268 days.

This patent is subject to a terminal disclaimer.

(21) Appl. No.: 17/132,036

(22) Filed: Dec. 23, 2020

(65) Prior Publication Data
US 2021/0110829 A1 Apr. 15, 2021

Related U.S. Application Data

(63) Continuation of application No. 16/257,566, filed on Jan. 25, 2019, now Pat. No. 10,957,320.

(51) Int. Cl.
G06F 40/35 (2020.01)
G10L 15/16 (2006.01)
(Continued)

(52) U.S. Cl.
CPC .............. *G06F 40/35* (2020.01); *G10L 15/16* (2013.01); *G10L 15/22* (2013.01); *G10L 15/32* (2013.01); *G10L 2015/225* (2013.01)

(58) Field of Classification Search
CPC ...................................... G10L 15/22
See application file for complete search history.

(56) References Cited

U.S. PATENT DOCUMENTS 5,999,904 A * 12/1999 Brown .................... G10L 15/22
704/E15.04
9,607,616 B2 * 3/2017 Watanabe ............... G10L 15/22
(Continued)

FOREIGN PATENT DOCUMENTS

WO  2006069381 A2  6/2006
WO  2017094911 A1  6/2017

OTHER PUBLICATIONS

Raux, Antoine, et al. "A Finite-State Turn-Taking Model for Spoken Dialog Systems" Human Language Technologies: The 2009 Annual Conference of the North American Chapter of the ACL, pp. 629-637, 2009. 9 pages.
(Continued)

*Primary Examiner* — Douglas Godbold
(74) *Attorney, Agent, or Firm* — Amin, Turocy & Watson, LLP

(57) ABSTRACT

Systems, computer-implemented methods, and computer program products that can facilitate predicting a source of a subsequent spoken dialogue are provided. According to an embodiment, a system can comprise a memory that stores computer executable components and a processor that executes the computer executable components stored in the memory. The computer executable components can comprise a speech receiving component that can receive a spoken dialogue from a first entity. The computer executable components can further comprise a speech processing com-
(Continued)

ponent that can employ a network that can concurrently process a transition type and a dialogue act of the spoken dialogue to predict a source of a subsequent spoken dialogue.

20 Claims, 10 Drawing Sheets

(51) Int. Cl.
  *G10L 15/22* (2006.01)
  *G10L 15/32* (2013.01)

(56) References Cited

U.S. PATENT DOCUMENTS

| | | | |
|---|---|---|---|
| 9,842,106 B2* | 12/2017 | Hori | G06N 3/0454 |
| 10,957,320 B2* | 3/2021 | Polymenakos | G10L 15/32 |
| 2004/0107100 A1* | 6/2004 | Lu | G10L 17/00 |
| | | | 704/238 |
| 2008/0004881 A1* | 1/2008 | Attwater | G10L 15/08 |
| | | | 704/E15.04 |
| 2017/0091171 A1* | 3/2017 | Perez | G06F 40/35 |
| 2017/0161372 A1* | 6/2017 | Fernández | G06F 40/211 |
| 2017/0270093 A1* | 9/2017 | Hosn | G06F 40/117 |
| 2017/0337478 A1* | 11/2017 | Sarikaya | G06F 3/167 |
| 2017/0352347 A1 | 12/2017 | Sharma et al. | |
| 2017/0365252 A1 | 12/2017 | Ushio et al. | |
| 2017/0372200 A1* | 12/2017 | Chen | G06N 3/0445 |
| 2017/0372694 A1* | 12/2017 | Ushio | G06F 40/35 |
| 2018/0039888 A1* | 2/2018 | Ge | G10L 17/04 |
| 2018/0046614 A1* | 2/2018 | Ushio | G06F 40/35 |
| 2018/0376108 A1* | 12/2018 | Bright-Thomas | G06K 9/6274 |
| 2019/0130212 A1* | 5/2019 | Cheng | G06K 9/6252 |
| 2019/0213284 A1* | 7/2019 | Anand | G06F 40/35 |
| 2019/0341036 A1* | 11/2019 | Zhang | G10L 17/00 |
| 2020/0110915 A1* | 4/2020 | Long | G06F 40/56 |
| 2020/0175364 A1* | 6/2020 | Xu | G06N 3/04 |
| 2020/0219517 A1* | 7/2020 | Wang | G10L 17/04 |

OTHER PUBLICATIONS

Aldeneh, Zakaria, et al. "Improving End-of-Turn Detection in Spoken Dialogues by Detecting Speaker Intentions as a Secondary Task." International Conference on Acoustics, Speech, and Signal Processing. Apr. 2018. 5 pages.

Non-Final Office Action received for U.S. Appl. No. 16/257,566 dated Jul. 27, 2020, 34 pages.

Guntakandla, Nishitha, and Rodney D. Nielsen. "Modelling Turn-Taking in Human Conversations." 2015 AAAI spring symposium series. 2015. (Year 2015).

Notice of Allowance received for U.S. Appl. No. 16/257,566 dated Nov. 18, 2020, 23 pages.

\* cited by examiner

END-OF-TURN DETECTION IN SPOKEN DIALOGUES

BACKGROUND

The subject disclosure relates to machine learning, and more specifically, to speech recognition and processing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate predicting a future source of dialog.

According to an embodiment, a system can comprise a memory that stores computer executable components and a processor that executes the computer executable components stored in the memory, the computer executable components comprising a speech receiving component that can receive a spoken dialogue from a first entity. The computer executable components can further comprise a speech processing component that can employ a network that can concurrently process a transition type and a dialogue act of the spoken dialogue to predict a source of a subsequent spoken dialogue.

According to another embodiment, a computer-implemented method can comprise receiving, by a system operatively coupled to a processor, a spoken dialogue from a first entity. The computer-implemented method can further comprise predicting, by the system, a source of a subsequent spoken dialogue by employing, by the system, a network that concurrently processes a transition type and a dialogue act.

According to another embodiment, a computer program product that can facilitate predicting a source of a subsequent spoken dialogue is provided. The computer program product can comprise a computer readable storage medium having program instructions embodied therewith, the program instructions can be executable by a processor to cause the processor to receive, by the processor, a spoken dialogue from a first entity. The program instructions can also cause the processing component to predict, by the processor, the source of the subsequent spoken dialogue by employing, by the processor, a network that concurrently processes a transition type and a dialogue act.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Speech processing can make interactions with spoken dialogue systems (e.g., a speaker using spoken I/O with a computer system) more natural and less rigid. Speech processing can also facilitate the parsing, by computer systems, of conversations between two or more speakers. Turn-management allows participants in a dialogue to exchange control of the floor, e.g., facilitating a determination of an order of dialogue of one or more participants. Conversation partners rely on many different types of cues to determine who will speak next, including lexical cues (e.g., meanings of spoken words: "So what do you think?") and acoustic cues (e.g., pauses of different variations in a conversation).

Turn-taking in conversations can take many forms. The two basic turn-taking functions are turn-hold and turn-switch. Given an utterance in a conversation, a turn-hold indicates that the next utterance will be uttered by the same speaker while a turn-switch indicates that the next utterance will be uttered by the other speaker in the conversation.

One or more embodiments described herein can receive speech as an acoustic signal and, by analyzing the signal using different approaches, predict who the next speaker will be in a conversation, e.g., predict turn-holds and turn-switches. One or more embodiments can improve the accuracy and performance of detecting these events in dyadic spoken dialogues. Based on the features of one or more embodiments described herein, the process of automated dialogue management can be improved.

Figure 1:
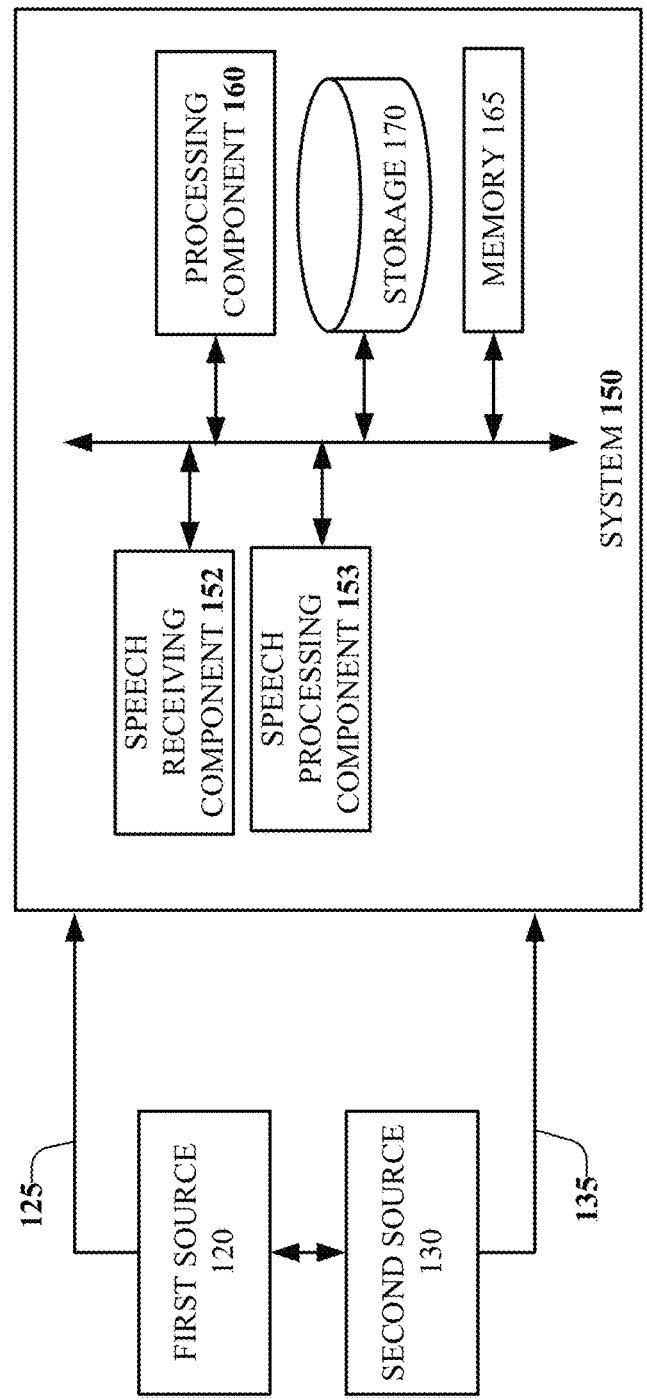
FIG. 1 illustrates a block diagram of an example, non-limiting system that can facilitate predicting a future source of dialogue in accordance with one or more embodiments described herein.

FIG. 1 illustrates a block diagram of an example, non-limiting system 150 that can facilitate predicting a future source of dialogue (e.g., the next speaker) in accordance with one or more embodiments described herein.

Speech receiving component 152 can receive first audio signal 125 and second audio signal 135 from first source 120 and second source 130 respectively. In one or more embodiments, first audio signal 125 can be a sequence of acoustic frames containing one or more utterances, e.g., uninterrupted chains of spoken language.

To facilitate processes, store results, and provide storage for processor executable components, system 150 accesses memory 165 and storage 170, these respectively being, for example, Random Access Memory (RAM) and a hard drive. Processing component 160 can receive executable instructions from memory 165 and storage 170 and execute functional components, such as 152 and 153 discussed above.

As described further below, one or more embodiments can predict turn-switches by one or more approaches that can be utilized individually or in combination with other approaches. In an example, one or more embodiments can use an algorithm that predicts a turn-switch for an utterance based on characteristics of the utterance in an audio signal. Continuing this example, the one or more embodiments can also infer the intention of a speaker based on characteristics of the utterance. In this example, a combination of results of the two approaches can be used to yield a prediction of a turn-switch. Both of these approaches are discussed further below.

With respect to the first approach discussed above, different factors can provide indications of turn-switches or turn-holds in a conversation. For example, in one or more embodiments, it can be determined by analyzing acoustic cues that utterances with contours of intonation correlate with turn-transitions, while flat intonations correlate with turn-holds.

With respect to inferring speaker intentions discussed above, one or more embodiments can infer the intention of a speaker when they made an utterance. An intent to question, request, and make a statement can be termed a dialogue act in that these are utterances that a speaker intends to serve a function in a dialogue, e.g., from the other speaker: a question intends to seek information, a request intends to seek some action, and a statement seeks intends to convey information. In one or more embodiments, identifying which of the above intentions is present in a speaker at the time of an utterance can provide an indication as to who will speak next.

It should be noted that, as used herein, different unknown values can be described as being: identified, determined, inferred, and predicted. These terms should be considered to have equivalent meanings, and they are applied to events that will occur in the future (predict), occurred in the past (identify, determine), or are not knowable for sure at the moment (inferred).

An example of an utterance that can be indicative of different dialogue acts is: "There is a library nearby." Interpreted in a purely lexical way, this utterance could be interpreted as at least three different dialogue acts, e.g.: a question to a listener asking whether a library is nearby, a request to a listener seeking directions to a nearby library, or a statement to a listener about a nearby library. In another example, the utterance "see you later," in addition to being either a question, request, or statement, can also be a closing dialogue act, e.g., an utterance ending a conversation. In one or more embodiments, speaker identified dialogue acts can be good predictors of turn-taking behavior, e.g., in one or more embodiments, a switch in speaker turns is more likely to occur after encountering a question than it is to occur after encountering a statement.

An additional factor that can be considered by embodiments is the timing of dialogue act occurrence in a dialogue. Certain dialogue acts, when occurring at different relative times in an utterance (e.g., beginning, middle, or end) can be indicative of the intent of a speaker. For example, returning to the "there is a library nearby" utterance, if these words appear at the end of an utterance, it can increase the likelihood that the dialogue act is a question or a request. In another example, after a dialogue act has been identified by one or more embodiments, the time placement of the identified dialogue act can be relevant to other analyses, e.g., the likelihood of a turn-switch occurring, as discussed herein.

Returning to the components of FIG. 1, in one or more embodiments, because speaker intentions are not readily available at run-time, to improve results, speech processing component 153 can analyze an utterance to concurrently predict, both whether a turn-switch is indicated by the utterance, and what the intention of first source 120 was when the utterance was made, e.g., identifying whether a dialogue act was made, and if so, which act. As discussed further below, in one or more embodiments, by combining speaker intention and turn-switch indicator analysis, one or more embodiments can predict the next speaker in a dialogue better than either analysis performed separately.

Figure 2:
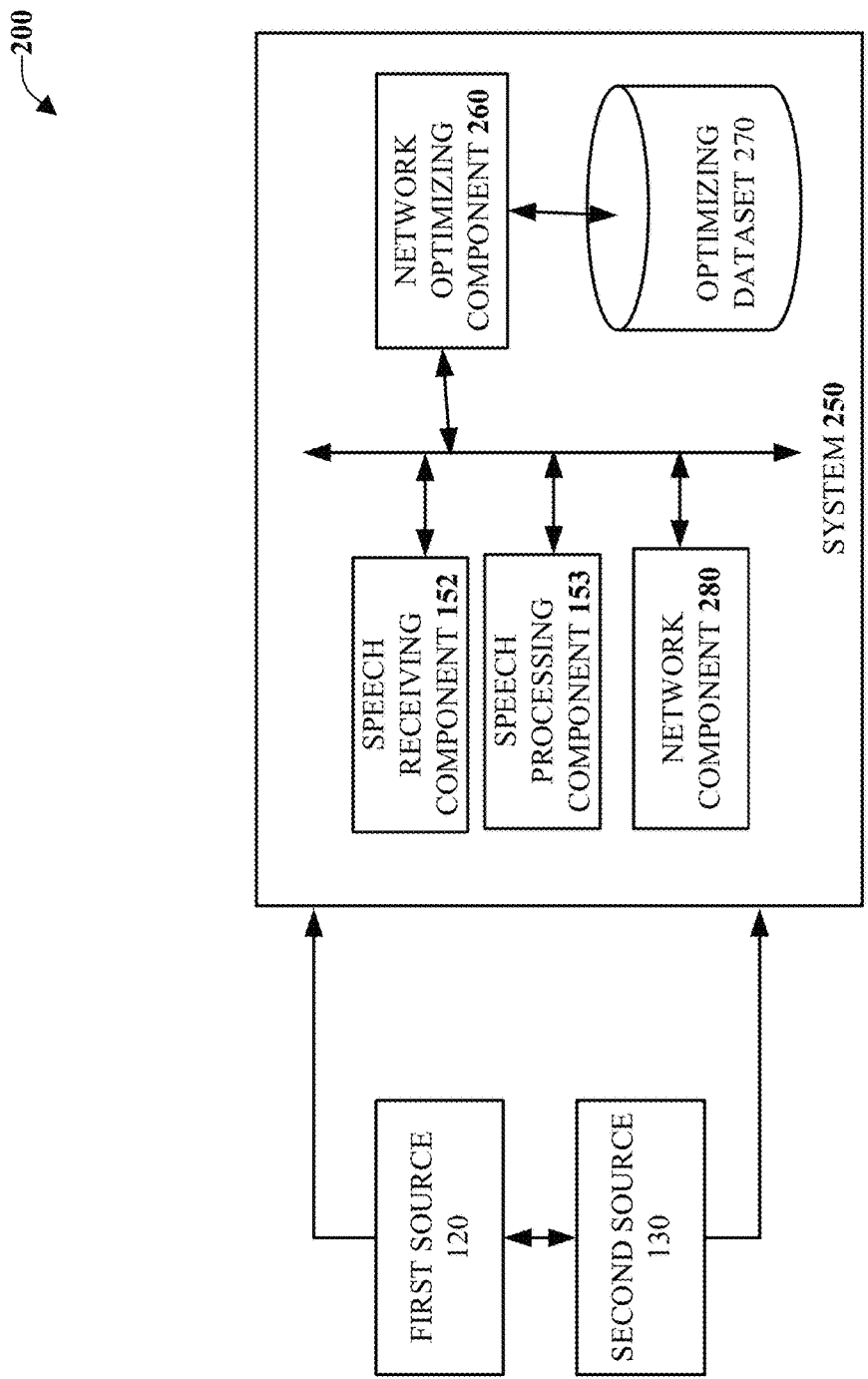
FIG. 2 illustrates an implementation of an example, non-limiting system that can facilitate predicting a future source of dialogue by employing an artificial neural network in accordance with one or more embodiments described herein.

One type of analysis that can be performed by one or more embodiments to infer speaker intentions and predict turn-switches can be the analysis of acoustic cues, these including, for example: intonation, pitch changes, speaking rate, and pauses occurring between utterances in a dialogue. In one or more embodiments, only the analysis of acoustic cues is be used to predict both speaker intentions and turn-switches from as little as one utterance. It is important to note that this example is non-limiting, and one or more embodiments can use combinations of different types of speech analysis for the two predictions. For example, the predictions can be performed by different combinations of analysis including, lexical analysis, syntactical analysis, analysis of acoustic cues, and other types of speech analysis. The acoustic cues only approach can be used by one or more embodiments based on performance and accuracy advantages, e.g., other analysis approaches can require more processor intensive processes. For example, lexical analysis can require use of speech recognition routines which are processor intensive compared to an analysis of acoustic cues only. FIG. 2 describes different machine learning approaches that can be used to implement the above noted concurrent analyses.

FIG. 2 illustrates an implementation of an example, non-limiting system that can facilitate predicting a future source of dialogue by employing a neural network in accordance with one or more embodiments described herein. Repetitive description of like elements and/or processes employed in respective embodiments is omitted for sake of brevity.

This figure depicts first source 120 and second source 130, speech receiving component 152, and speech processing component 153 of FIG. 1, and further includes network component 280, network optimizing component 260, and optimizing dataset 270 in system 250. In one or more embodiments, network component 280 is a neural network that can be optimized by network optimizing component 260 to perform the concurrent analyses of dialogue discussed herein. It should be noted that the description of employing a neural network included below is non-limiting, e.g., one or more embodiments can use other types of machine learning algorithms that receive input and make predictions.

One type of neural network that has characteristics that can benefit one or more embodiments described herein is a Multi-task (MT) neural network. For example, MT neural networks, unlike standard neural networks, can allow for the optimizing of both a primary task and one or more auxiliary tasks that can be related to the primary task. One advantage of this capability is that it allows the model to use representations that encode information about both tasks. For example, in one or more embodiments, logic that can infer speaker intention can also be encoded with the logic used to predict turn-switches and vice versa.

In one or more embodiments, the primary task of network component 280 can be predicting turn-transitions, and an auxiliary task can be inferring user intention. In example implementations, by handling these tasks in a MT neural network, embodiments can optimize the network component 280 for both tasks using the same optimizing dataset 270, and thus improve the accuracy of the performance of both tasks. The optimizing and use of network component 280 are discussed with FIGS. 3 and 4 below.

Figure 3:
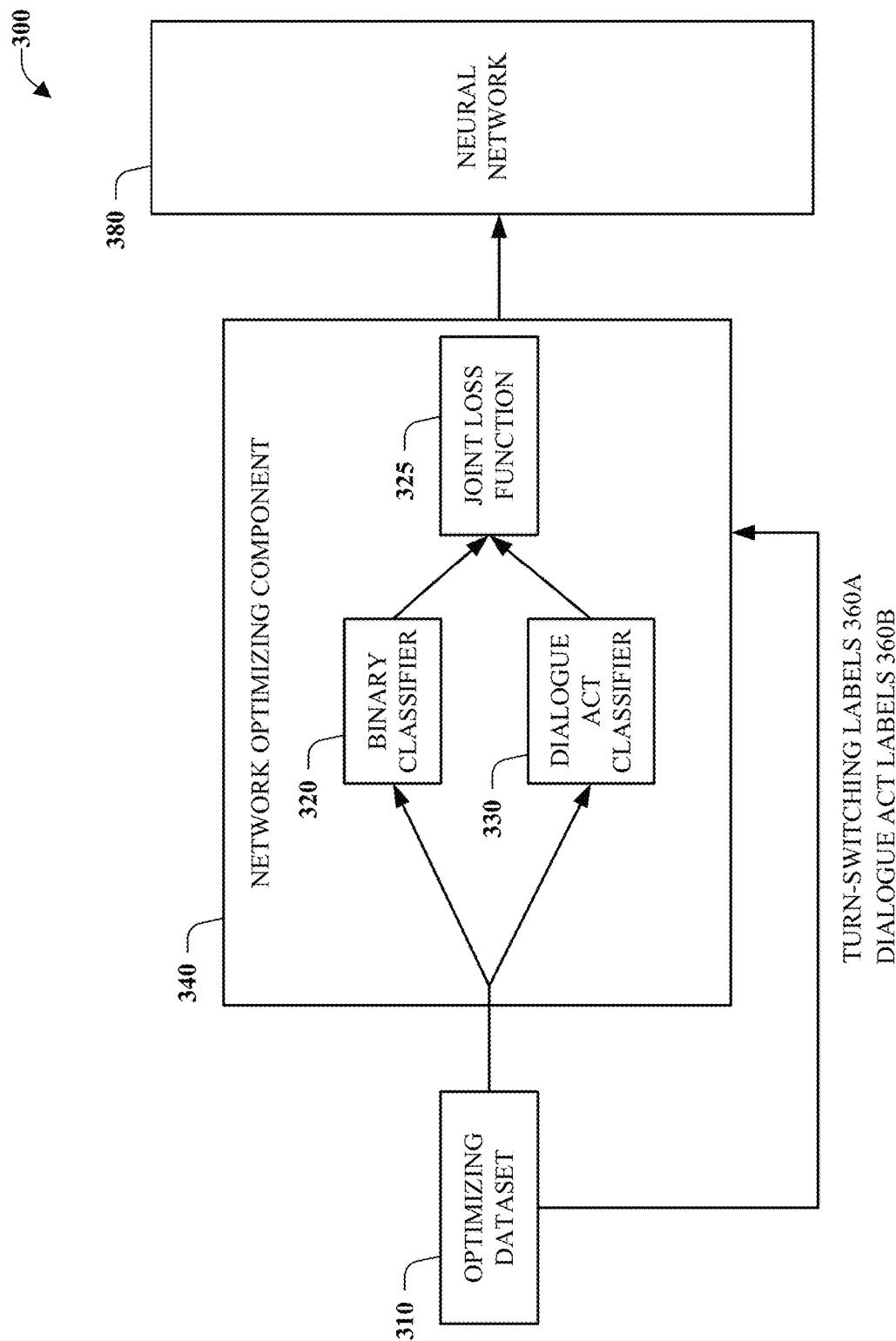
FIG. 3 illustrates a process of optimizing a neural network used to facilitate predicting a future source of dialogue in accordance with one or more embodiments described herein.

Because one or more embodiments model a sequence of acoustic features where past features can influence conclusions about current features, features of another type of neural network can be advantageously used with embodiments of the MT neural network discussed above. Generally speaking, Long Short-Term Memory (LSTM) networks, as used by one or more embodiments, are neural networks that can have loops in them, allowing some data to persist from one analysis to another. When one or more embodiments use an LSTM neural network to process sequences of acoustic frames over time, this persistence of some data can be advantageous. In addition to their ability to capture past signal behavior, LSTMs can capture information relating to timing and differentials, both of which can be used by one or more embodiments to model and predict turn-switching behavior. FIG. 3 describes a process by which the neural networks used by one or more embodiments can be optimized for use.

FIG. 3 illustrates a process 300 of optimizing a neural network used to facilitate predicting a future source of dialogue in accordance with one or more embodiments described herein. Repetitive description of like elements and/or processes employed in respective embodiments is omitted for sake of brevity.

As included in FIG. 3, network optimizing component 340 can receive optimizing dataset 310 and, after processing, can use this data to optimize neural network 380. In one or more embodiments, optimizing dataset 310 can include complete sentences, that contain both acoustic and lexical cues, and vary in duration.

One example dataset that can be used to optimize one or more embodiments comprises dyadic telephony conversations between participants who were asked to discuss various topics. The dataset conversations for analysis can include metadata that indicates the dialogue act types that were intended by utterances. This metadata can be used as ground truth labels for the optimization, as discussed below. For example, unlike rules-based systems, where specific relationships between values must be specifically defined, neural networks can use machine learning to learn combinations of features automatically, based on a datasets, including turn-switching labels 360A and dialogue act labels 3x60B.

In one or more embodiments, neural network 380 is a MT neural network that can concurrently process an utterance from optimizing dataset 310 to predict a turn-switch and infer a dialog act of the utterance. Illustrating this concurrent processing, in FIG. 3, network optimizing component 340 can receive optimizing dataset 310 for concurrent processing by both binary classifier 320 and dialogue act classifier 330.

One or more embodiments can use dialogue act classifier 330 to classify dialogue acts in one or more dialogue act classes, e.g., statement, opinion, agree, abandon, backchannel, question, and answer. Binary classifier 320 can concurrently analyze the audio data and classify utterances as either indicating a turn-switch prediction or turn-hold prediction. Some algorithms that can be used by one or more embodiments are described below.

A dyadic dialogue can be represented, by one or more embodiments, as a sequence of utterances, taking the form of Equation Number 1, where each $u_i$ is an utterance in the conversation:

$$u_1, u_2, \ldots u_N \qquad \text{Equation Number 1}$$

Based on the above, one or more embodiments use a function, $spkr(\bullet)$ that can return the speaker of a given utterance. Analyzing the utterance ($u_i$) can result in a prediction of whether the following Equation Number 2 is true or false:

$$spkr(u_i) \neq spkr(u_{i+1}) \qquad \text{Equation Number 2}$$

In one or more embodiments, if Equation Number 2 is true, then a turn-switch is predicted to take place with the other speaker speaking next. If Equation Number 2 is false, then a turn-hold is predicted to occur with current speaker continuing speaking. As discussed below, in one or more embodiments shown in FIG. 3 both the results of binary classifier 320 and dialogue act classifier 330 can be reconciled to solve Equation Number 2 above.

In one or more embodiments, the results of binary classifier 320 and dialogue act classifier 330 can be reconciled by minimizing joint loss function 325. This function can be a combination of two or more loss functions that use ground truth labels to identify and address potential errors in the model.

In an example, a dataset can have a sample conversation between two speakers, with one speaker saying "see you later." Handling this utterance, an embodiment can detect question related acoustic cues, e.g., intonation, tone changes, etc. After evaluating all the available factors and weighing them based on previous learning, binary classifier 320 can predict a turn-switch based on intonation and dialogue act classifier 330 can infer a question dialogue act based on tonal cues. However, without metadata for this conversation that includes the actual intent of the speaker during the utterance (e.g., dialogue act labels 360B), network optimizing component 340 could not either confirm or modify the logic that caused dialogue act classifier 330 to classify the utterance as a question.

In one or more embodiments, minimizing joint loss function 325 can take the form of Equation Number 3 below, where $L_{turn}$ is the loss function for turn predictions, $L_{intent}$ is the loss function for speaker intention predictions, $L_{tot}$ is the overall loss function, and $\lambda_1$ and $\lambda_2$ can be weights selected to control the influence of each loss function in joint loss function 325:

$$L_{tot} = \lambda_1 L_{turn} + \lambda_2 L_{intent} \qquad \text{Equation Number 3}$$

In an example, weights can be assigned that reduce the influence of the intent loss function compared to the turn predictions loss function, e.g., $\lambda_1=1.0$ and $\lambda_2=0.5$. Using the results of joint loss function 325, one or more embodiments can optimize the neural network models by optimizing the weighted negative log-likelihood loss function and further using a gradient descent optimizer.

It should be noted that the approaches described above (of optimizing a neural network with optimizing data, and subsequently using the optimized neural net) are non-limiting. One having skill in the relevant art(s), given the description herein would appreciate that the same concurrent processing of the same audio features can also be employed in a real-time system that does not require optimization before use.

Figure 4:
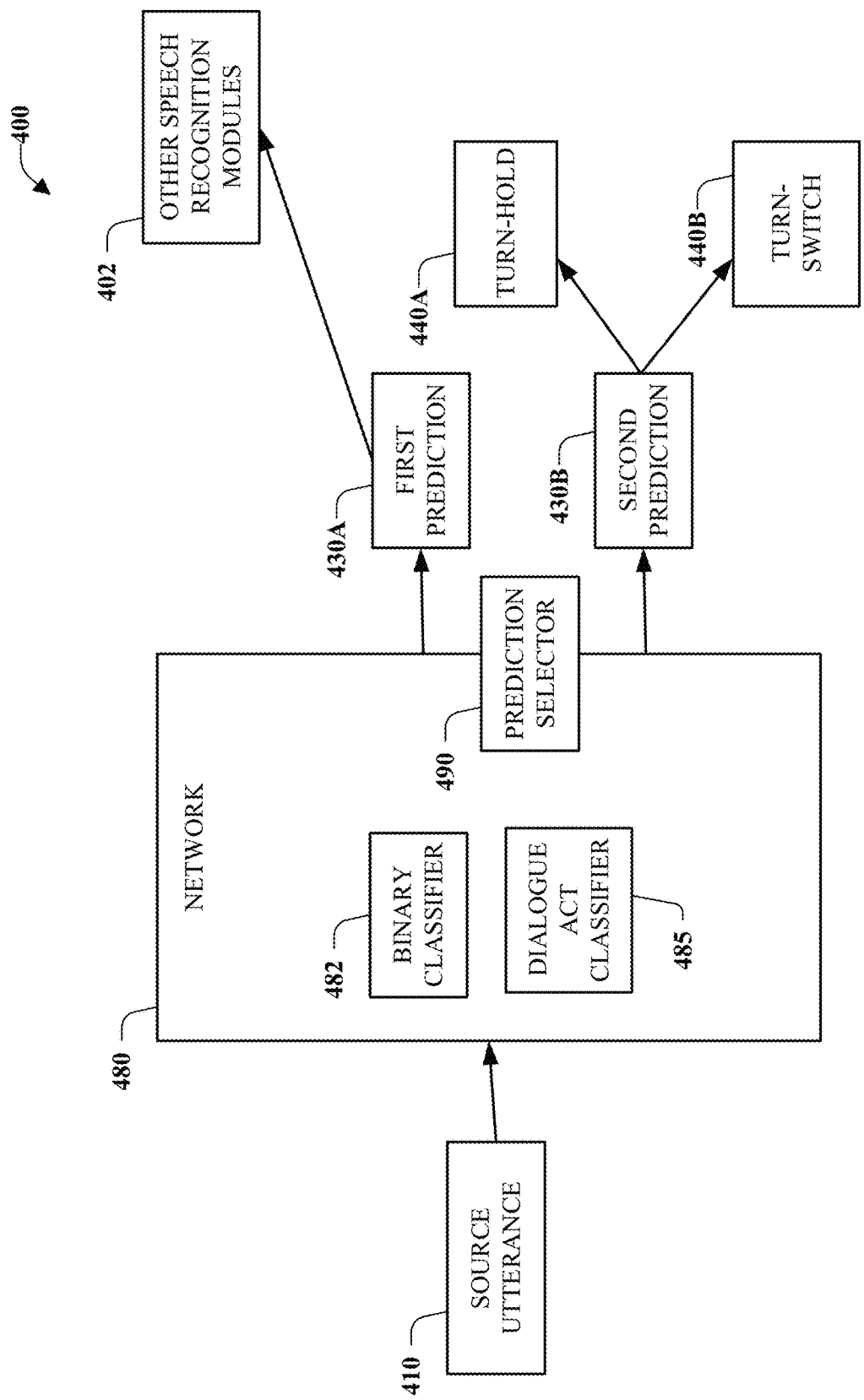
FIG. 4 illustrates algorithms employed by a neural network after optimization to facilitate predicting a future source of dialogue in accordance with one or more embodiments described herein.

FIG. 4 illustrates algorithms employed by a neural network after optimization to facilitate predicting a future source of dialogue in accordance with one or more embodiments described herein. Repetitive description of like elements and processes employed in respective embodiments is omitted for sake of brevity.

In one or more embodiments, as discussed with FIG. 3 above, in one or more optimizing phases, neural networks can be optimized with datasets, then at run time the models can be used to provide results from input, e.g., by analyzing utterances to predict turn-switches in dyadic dialogue. FIG. 4 depicts network 480 at run time, receiving a source utterance 410 from a speaker in a conversation with another speaker (not shown).

In one or more embodiments, at run time, network 480 is a MT neural network that can concurrently process source utterance 410 using binary classifier 482 and dialogue act classifier 485, both of these being optimized using the processes described above. The concurrent processing, in one or more embodiments, can result in first prediction 430A and second prediction 430B. Prediction selector 490, part of the logic of network 480, can be optimized during the optimization phase, in one or more embodiments, to select one of the predictions for use as output from network 480, given source utterance 410. In the example shown in FIG. 4, second prediction 430B can be selected, and this prediction can be either turn-hold 440A or turn-switch 440B.

As depicted in the embodiment of FIG. 4, although first prediction 430A was not selected for network 480 output by prediction selector 490, this prediction can still have value. In one or more embodiments, first prediction 430A can be output to other speech recognition modules 402 for use as an element to other analyses.

It is to be appreciated that the functions of components of embodiments discussed herein (e.g., network 480, network optimizing component 340) cannot be performed by a human, e.g., the functions performed are greater than the capability of a single human mind. For example, an amount of data processed, a speed of data processed or data types of data processed (e.g., hard to interpret acoustic cues) by one or more embodiments over a certain period of time can be greater, faster, and different than an amount, speed and data type that can be processed by a single human mind over the same period of time.

Figure 5:
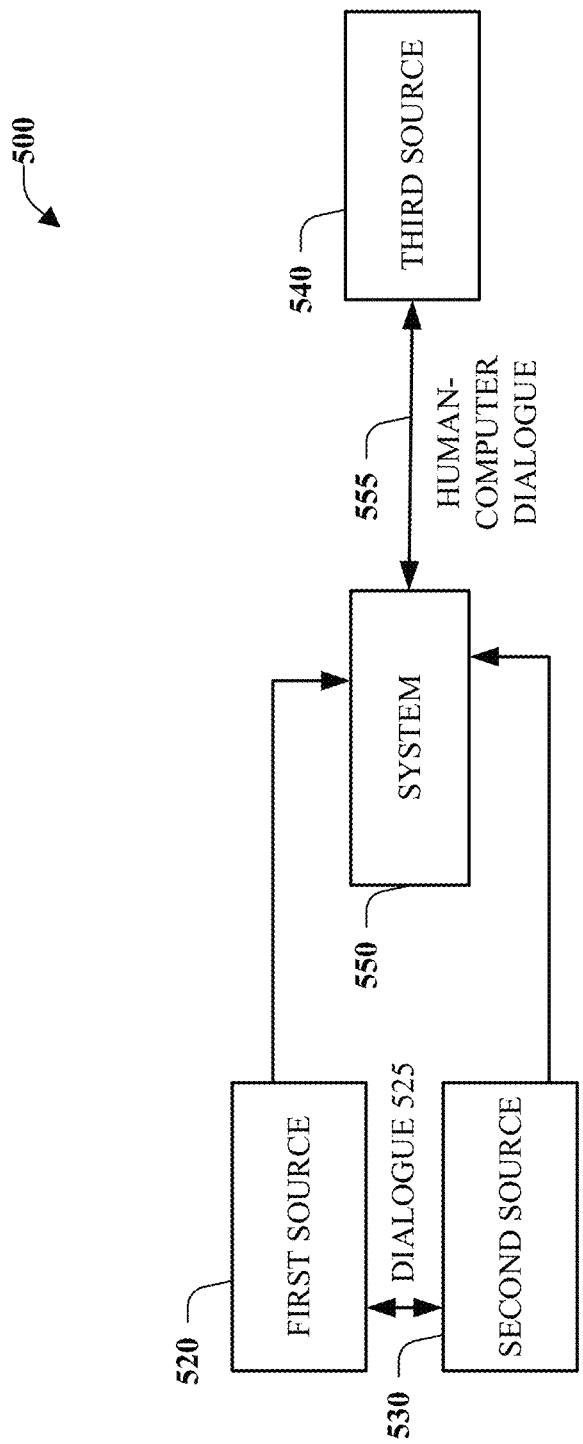
FIG. 5 illustrates example dialogue sources engaging in a spoken dialogue with one or more embodiments described herein predicting a future source of dialogue between the sources.

FIG. 5 illustrates example dialogue sources engaging in a spoken dialogue with one or more embodiments described herein predicting a future source of dialogue. Repetitive description of like elements and/or processes employed in respective embodiments is omitted for sake of brevity.

This figure depicts first source 520 conducting a dialogue 525 with second source 530, while being monitored, using approaches described by embodiments herein, by system 550. In this example, as discussed with FIG. 10 below, system 550 can be on a mobile device possessed by first source 520, and the portability of this mobile device can facilitate system 550 supporting a variety of functions with respect to dialogue 525, e.g., moderator, summarizer, opportunistic information provider, etc. The structure of a dialogue between two speakers, as analyzed by one or more embodiments, is discussed with FIG. 6 below.

FIG. 5 also depicts third source 540 engaged in human computer dialogue (HCD) 555 with system 550, using aspects of embodiments described herein with respect to two speaker dialogues, e.g., dialogue 525. As described above, one or more embodiments can assess both turn-switches, and the intent of a speaker to perform different acts, e.g., dialogue acts. With respect to HCD dialogue, one or more embodiments can use these assessments to determine how best to respond to utterances of third source 540. For example, the capacity of one or more embodiments to correctly respond to third source 540 stating "there is a library nearby" in accordance with the intent of third source 540 (e.g., a question, request for directions, or a statement), can improve the usefulness of the speech interface of system 550. By correctly predicting whether third source 540 has completed speaking and whether a question was asked to system 550, system 550 can respond faster and without requesting clarification from third source 540. Additional examples of performance enhancements that can result from applying one or more embodiments to HCD 555 are discussed with FIG. 7 below.

Figure 6:
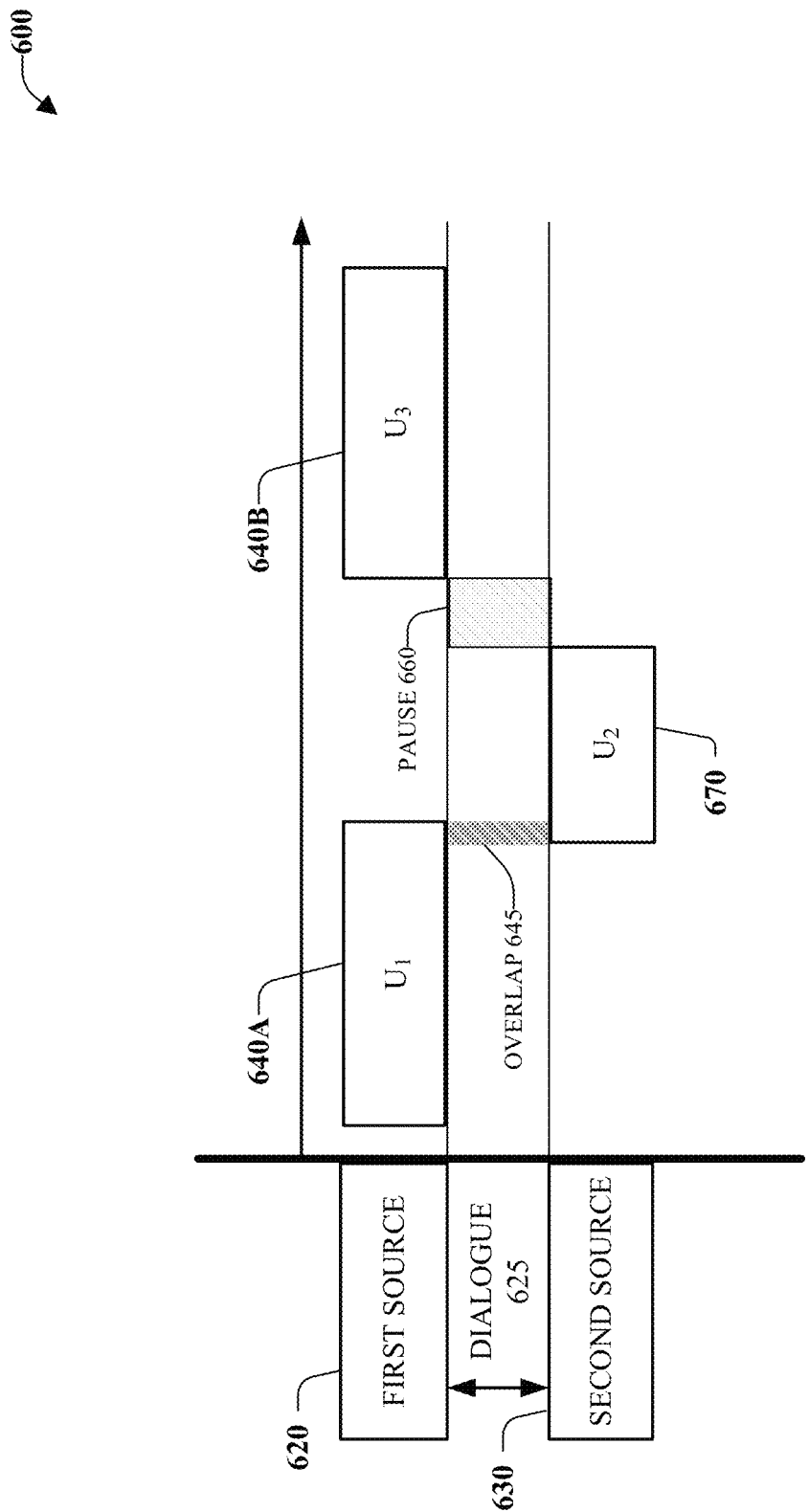
FIG. 6 depicts an example timeline that illustrates different features of dyadic dialogue structure that are analyzed in accordance with one or more embodiments described herein.

FIG. 6 depicts an example timeline that illustrates different features of dyadic dialogue structure that can be analyzed in accordance with one or more embodiments described herein. Repetitive description of like elements and/or processes employed in respective embodiments is omitted for sake of brevity.

Timeline 600 illustrates a dialogue 625 between first source 620 and second source 630. The conversation begins with utterance $U_1$ 640A from first source 620. In a notable event shown in FIG. 6 that can be detected and analyzed by one or more embodiments, before first source 620 completes $U_1$ 640A, second source 630 begins speaking utterance $U_2$ 670. The simultaneous speaking of first source 620 and second source 630 is labeled as overlap 645.

As can be assessed by one or more embodiments (e.g., by binary classifier 482), the acoustic cues from the overlapping speech can be identified and labeled as likely to cause a turn-switch. Moreover, as described above, concurrently with this analysis, one or more embodiments can analyze the acoustic cues of overlap 645 (e.g., by dialogue act classifier 485) and infer an interruption dialogue tag, e.g., second source 630 had a speaker intention to interrupt first source 620. One or more embodiments can combine this dialogue tag inference with the turn-switch prediction noted above to yield a prediction that the next utterance will be from second source 630 and not the original speaker, second source 620. Because the turn-switch occurs due to overlap 645, one or more embodiments can identify this turn-switch as an overlapping switch. As shown in FIG. 6, the turn-switch after $U_2$ 670 is a smooth switch, because there is silence (e.g., pause 660, an acoustic cue) from the two speakers between two consecutive utterances. After $U_3$ 640B is completed, the conversation ends.

Figure 7:
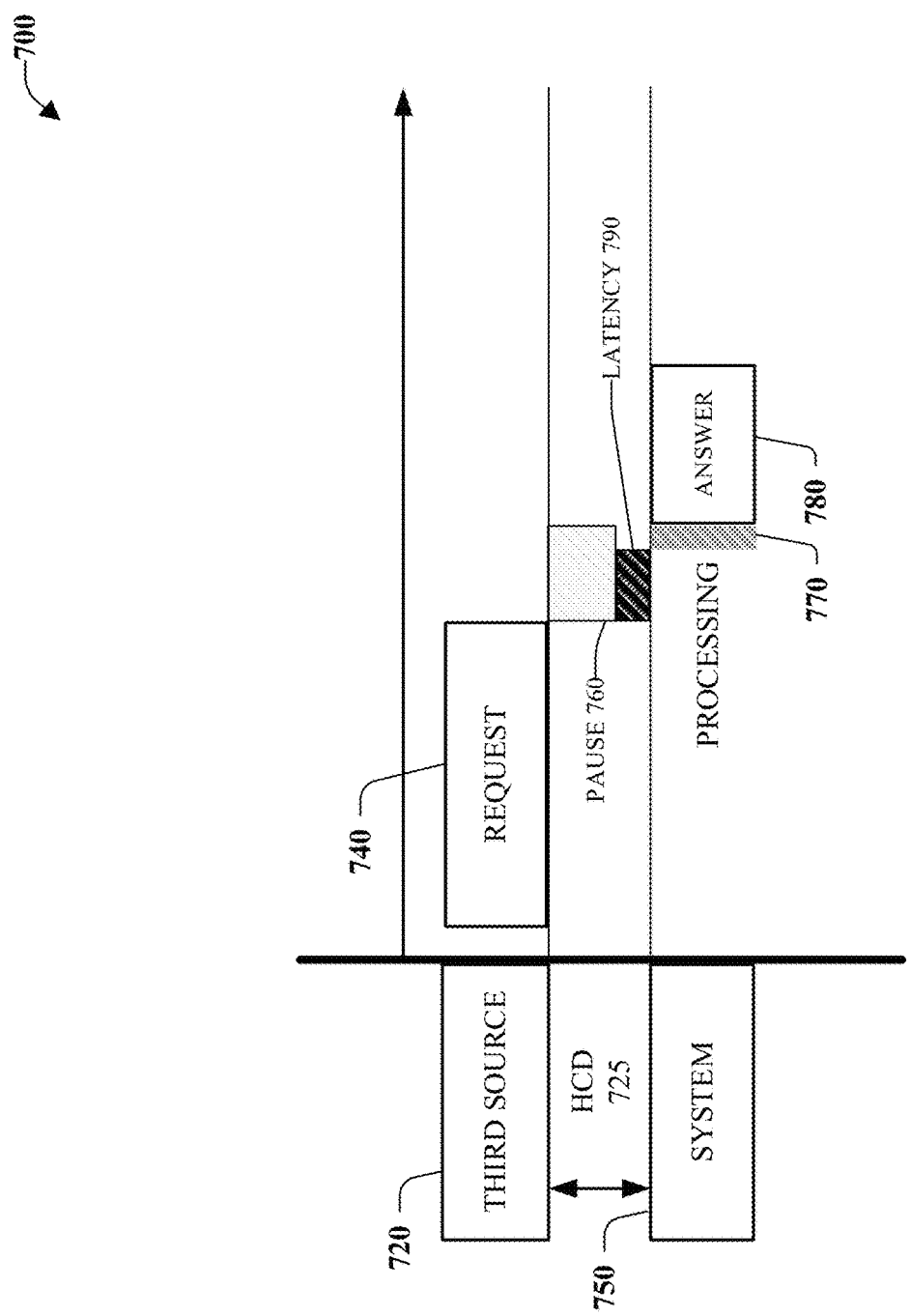
FIG. 7 depicts an example timeline that illustrates embodiments that can process human computer dialogue in accordance with one or more embodiments described herein.

FIG. 7 depicts an example timeline 700 that illustrates embodiments processing human computer dialogue in accordance with one or more embodiments described herein. Repetitive description of like elements and/or processes employed in respective embodiments is omitted for sake of brevity.

As discussed with FIG. 5 above (e.g., third source 540 engaging in HCD 555 with system 550), one or more embodiments can be used to predict turn-switches in dialogue between third source 720 and system 750, for example, using some embodiments described herein to facilitate performance of another function, e.g., an assistant function.

HCD 725 of timeline 700 begins with request 740 from third source 720. Based on acoustic cues, one or more embodiments can identify this utterance as a request for action dialogue act. When a computer is a second speaker in a dialogue, different considerations can be significant. One benefit that can be realized by one or more embodiments from improved turn-switch detection in this context can be an improvement in responsiveness and performance of the other function enabled by the speech analysis described herein, e.g., the assistant function noted above.

In an example assistant application, dialogue can occur in the form of request 740, pause 760, a turn-switch when request 740 is completed, processing 770 of request 740 by the assistant application, and answer 780 from the application. As discussed below, one area where one or more embodiments can improve performance is identified as latency 790.

As shown in FIG. 7, latency 790 is the time interval between the ending of request 740 and the beginning of processing 770 of the completed utterance by system 750. By definition, if system 750 is tasked with processing a completed request 740, then before processing 770, system 750 identifies that request 740 has been completed, e.g., that pause 760 is not a short pause during a longer request 740. Latency 790 can occur beginning when request 740 ends and ending when system 750 identifies request 740 as having ended.

One or more embodiments, by using one or more of the features described herein (e.g., by analyzing acoustic cues not resource intensive lexical cues, and conducting concurrent analyses to predict turn-switch behavior and infer speaker intention) can improve the accuracy of system 750, and reduce the time it takes to identify a turn-switch has commenced, thus reducing latency 790. These examples are intended to be non-limiting, and one or more embodiments can be used for many types of applications.

Figure 8:
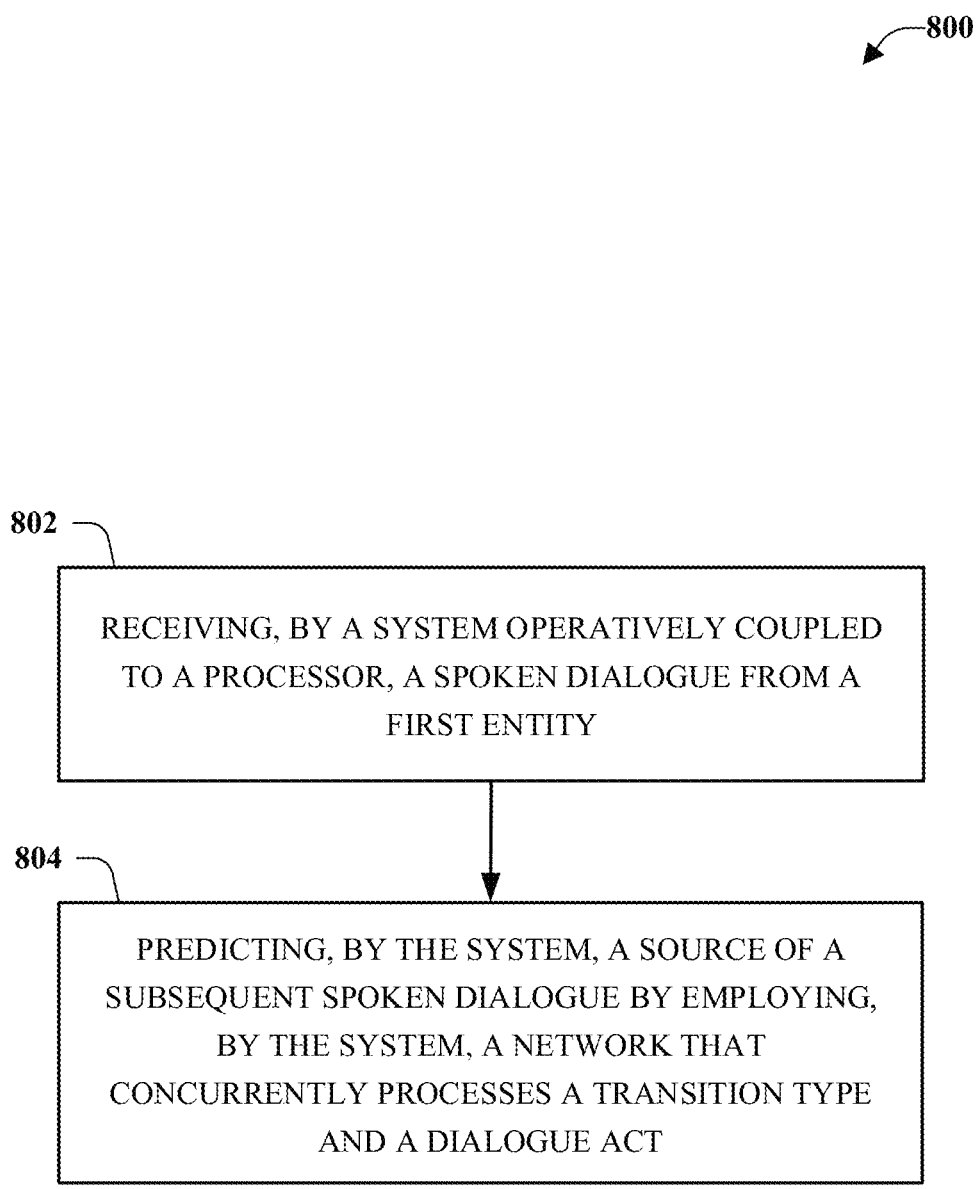
FIG. 8 illustrates a flow diagram of an example, non-limiting computer-implemented method that can facilitate predicting a future source of dialogue in accordance with one or more embodiments described herein.

FIG. 8 illustrates a flow diagram of an example, non-limiting computer-implemented method 800 that can facilitate predicting a source of a subsequent spoken dialogue in accordance with one or more embodiments described herein. Repetitive description of like elements and/or processes employed in respective embodiments is omitted for sake of brevity.

At 802 of the computer-implemented method 800, a system (e.g., system 150) operatively coupled to a processor (e.g., processing component 160) can receive a spoken dialogue (e.g., first audio signal 125) from a first entity (e.g., first source 120).

At 804 of the computer-implemented method 800, the system can predict the source of the subsequent spoken dialogue (e.g., first source 120 or second source 130) by employing, by the system, a network (e.g., network 480) that concurrently processes a transition type (e.g., binary classifier 482) and a dialogue act (e.g., dialogue act classifier 485).

Figure 9:
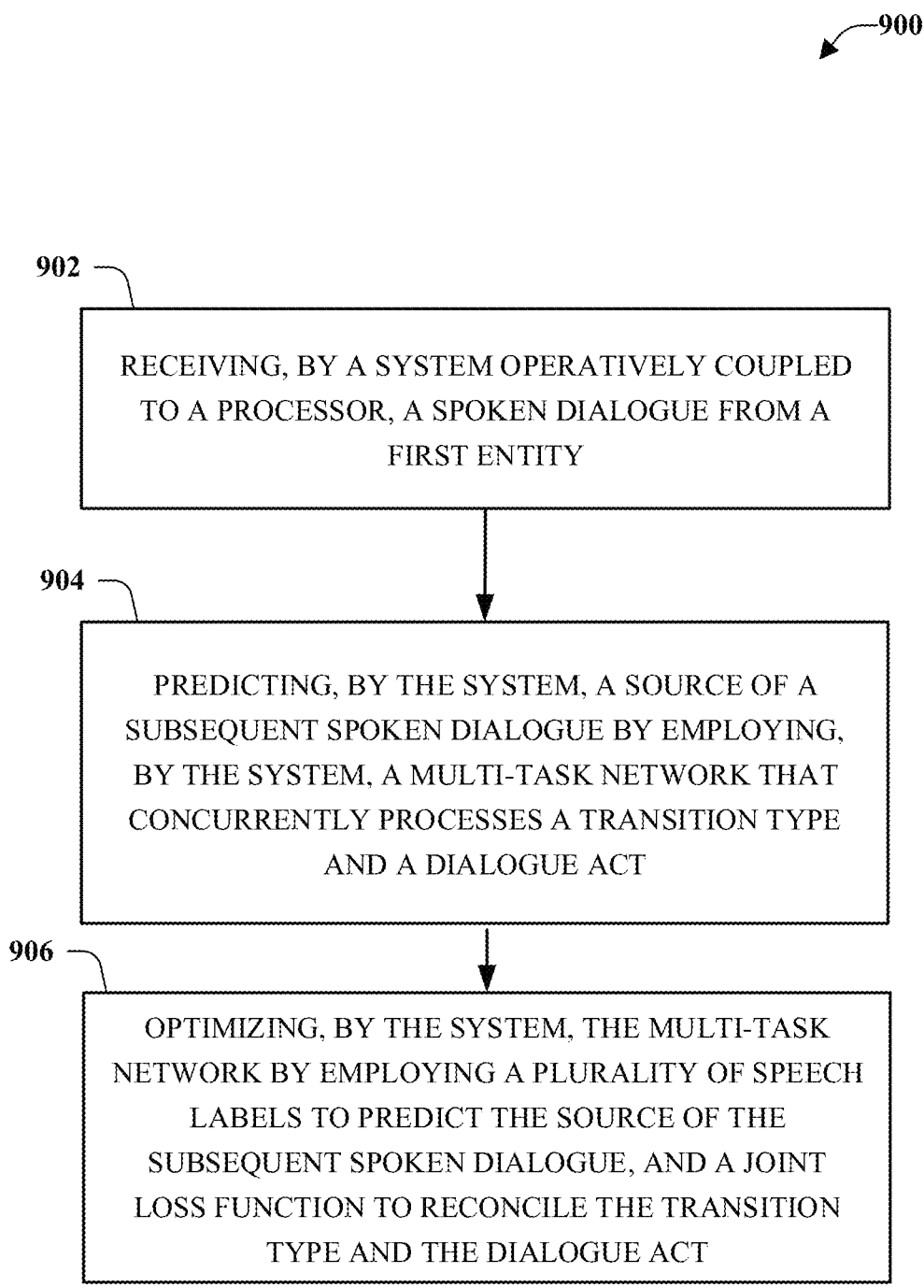
FIG. 9 depicts a flow diagram of an example, computer-implemented method that facilitates predicting a future source of dialogue in accordance with one or more embodiments described herein.

FIG. 9 depicts a flow diagram of an example, non-limiting computer-implemented method 900 that can facilitate predicting a source of a subsequent spoken dialogue using an optimized multi-task network (e.g., network optimizing component 340 and neural network 380) in accordance with one or more embodiments described herein. Repetitive description of like elements and/or processes employed in respective embodiments is omitted for sake of brevity.

At 902 of the computer-implemented method 900, a system operatively coupled to a processor can receive a spoken dialogue from a first entity.

At 904 of the computer-implemented method 900, the system can predict the source of the subsequent spoken dialogue by employing the multi-task network that concurrently processes a transition type and a dialogue act.

At 906 of the computer-implemented method 900, the system can optimize (e.g., network optimizing component 340) the multi-task network by employing a plurality of speech labels (e.g., turn switching labels 360A and dialogue act labels 360B) to predict the source of the subsequent spoken dialogue, and a joint loss function (e.g., joint loss function 325) to reconcile the transition type and the dialogue act.

Figure 10:
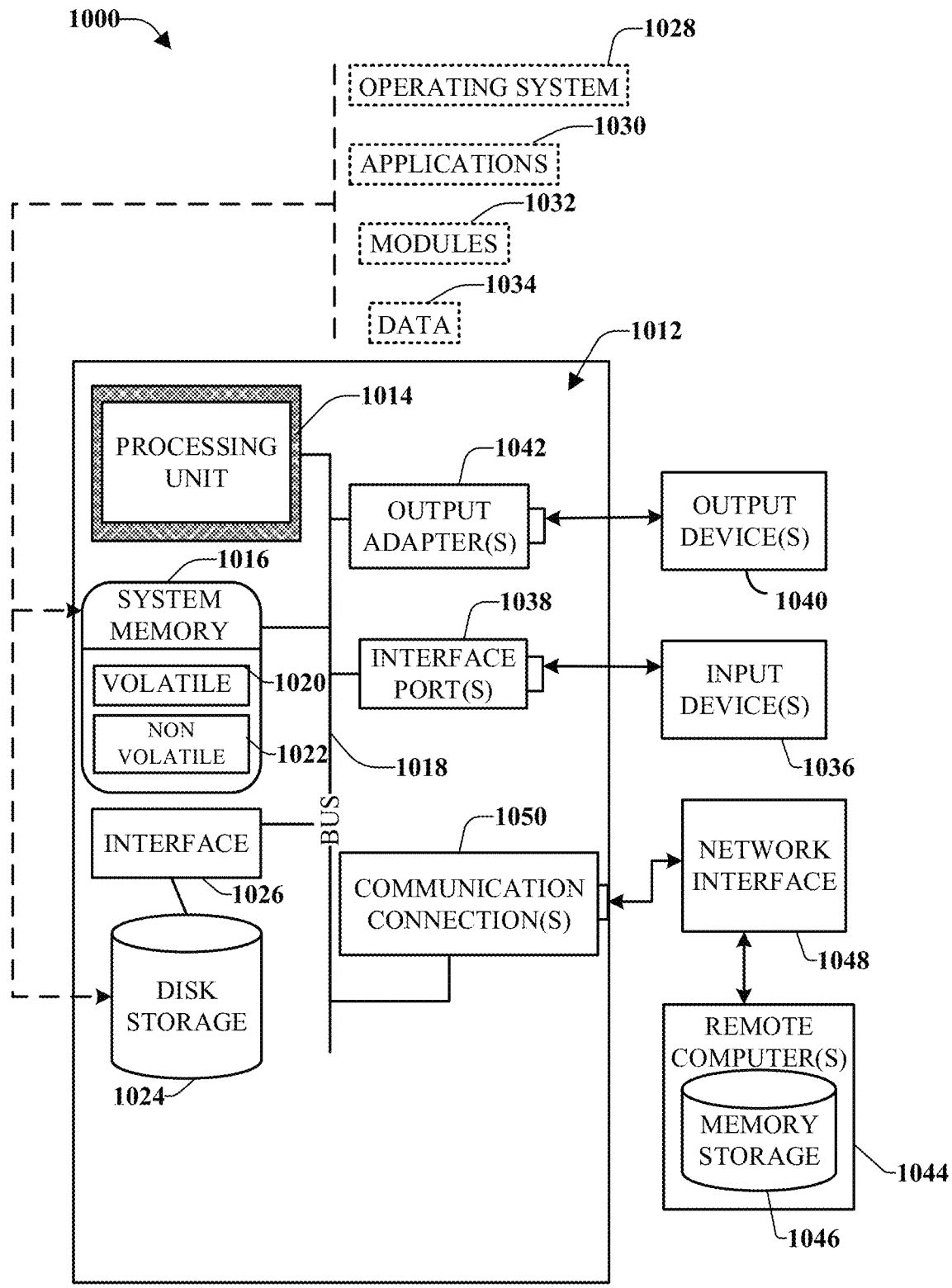
FIG. 10 illustrates a block diagram of an example, non-limiting operating environment in which one or more embodiments described herein can be facilitated.

FIG. 10 illustrates a block diagram of an example, non-limiting operating environment in which one or more embodiments described herein can be facilitated. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements and/or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile RAM (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a speech processing component that employs a neural network to process a spoken dialogue between a first entity and a second entity to predict a source of a subsequent spoken dialogue, wherein the neural network combines a first prediction of an intention of the spoken dialogue and a second prediction of a type of turn of the spoken dialogue to predict whether the source of the subsequent spoken dialogue will be the first entity or the second entity.

2. The system of claim 1, wherein the type of turn is selected from a group consisting of a turn hold, a turn switch, a smooth switch, and an overlapping switch.

3. The system of claim 1, wherein the intention is selected from a group consisting of an interruption, a question, a request, and a statement.

4. The system of claim 1, wherein the neural network employs a minimizing joint loss function to combine the first prediction and the second prediction.

5. The system of claim 4, wherein the minimizing joint loss function comprises a first loss function for the first prediction and a second loss function for the second prediction.

6. The system of claim 1, wherein the speech processing component determines at least one of the first prediction or the second prediction based on acoustic cues from the spoken dialogue.

7. The system of claim 6, wherein the acoustic cues comprise a cue selected from a group consisting of intonation, pitch change, speaking rate, and pause.

8. A computer-implemented method, comprising:
   processing, by a system operatively coupled to a processor, via a neural network, a spoken dialogue between a first entity and a second entity to generate a first prediction of an intention of the spoken dialogue and a second prediction of a type of turn of the spoken dialogue; and
   predicting, by the system, via the neural network, a source of a subsequent spoken dialogue by combining the first prediction and the second prediction.

9. The computer-implemented method of claim 8, wherein the type of turn is selected from a group consisting of a turn hold, a turn switch, a smooth switch, and an overlapping switch.

10. The computer-implemented method of claim 8, wherein the intention is selected from a group consisting of an interruption, a question, a request, and a statement.

11. The computer-implemented method of claim 8, wherein the neural network employs a minimizing joint loss function to combine the first prediction and the second prediction.

12. The computer-implemented method of claim 11, wherein the minimizing joint loss function comprises a first loss function for the first prediction and a second loss function for the second prediction.

13. The computer-implemented method of claim 8, further comprising determining, by the system, via the neural network, at least one of the first prediction or the second prediction based on acoustic cues from the spoken dialogue.

14. The computer-implemented method of claim 13, wherein the acoustic cues comprise a cue selected from a group consisting of intonation, pitch change, speaking rate, and pause.

15. A computer program product facilitating predicting a source of a subsequent spoken dialogue, the computer program product comprising a computer readable storage medium having program instructions embodied therewith, the program instructions executable by a processor to cause the processor to:
   process, via a neural network, a spoken dialogue between a first entity and a second entity to generate a first prediction of an intention of the spoken dialogue and a second prediction of a type of turn of the spoken dialogue; and
   predict, via the neural network, the source of the subsequent spoken dialogue by combining the first prediction and the second prediction.

16. The computer program product of claim 15, wherein the type of turn is selected from a group consisting of a turn hold, a turn switch, a smooth switch, and an overlapping switch.

17. The computer program product of claim 15, wherein the intention is selected from a group consisting of an interruption, a question, a request, and a statement.

18. The computer program product of claim 15, wherein the neural network employs a minimizing joint loss function to combine the first prediction and the second prediction.

19. The computer program product of claim 18, wherein the minimizing joint loss function comprises a first loss function for the first prediction and a second loss function for the second prediction.

20. The computer program product of claim 15, wherein the neural network is a multi-task neural network, and wherein the program instructions are further executable by the processor to cause the processor to determine, via the neural network, at least one of the first prediction or the second prediction based on acoustic cues from the spoken dialogue.

* * * * *